Sept. 15, 1970    J. CRUZ, JR    3,529,128
WELDING TORCH
Filed Sept. 27, 1967    2 Sheets-Sheet 1
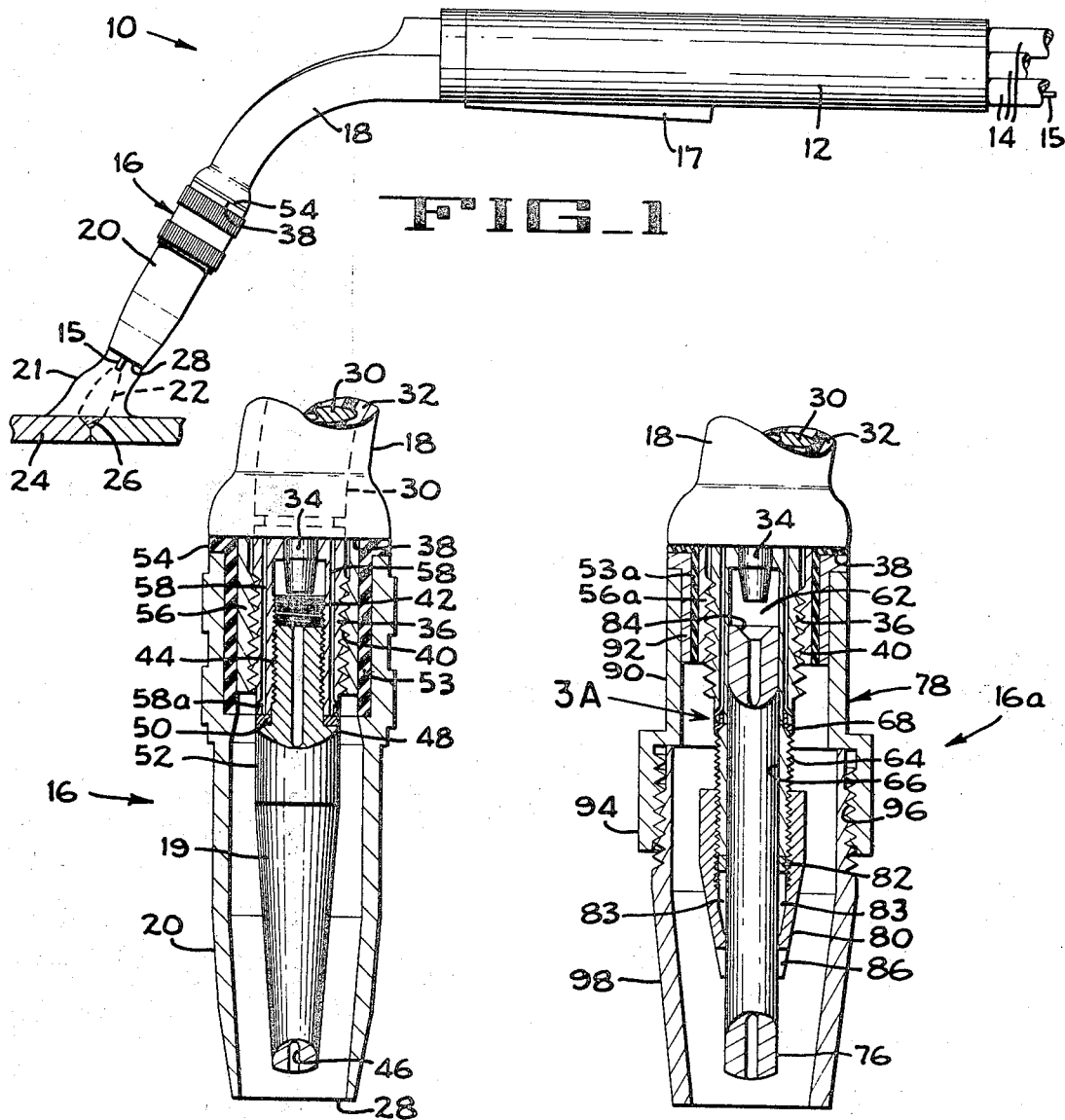
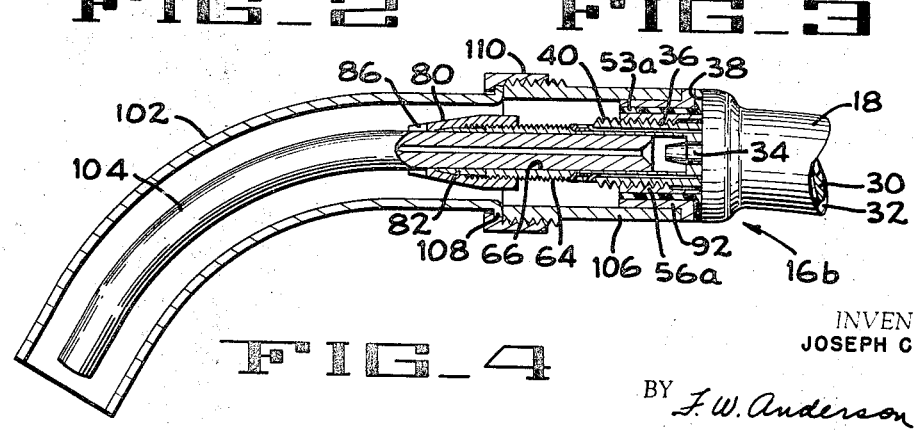
INVENTOR.
JOSEPH CRUZ, JR.
BY F.W. Anderson
C.E. Tripp
ATTORNEYS

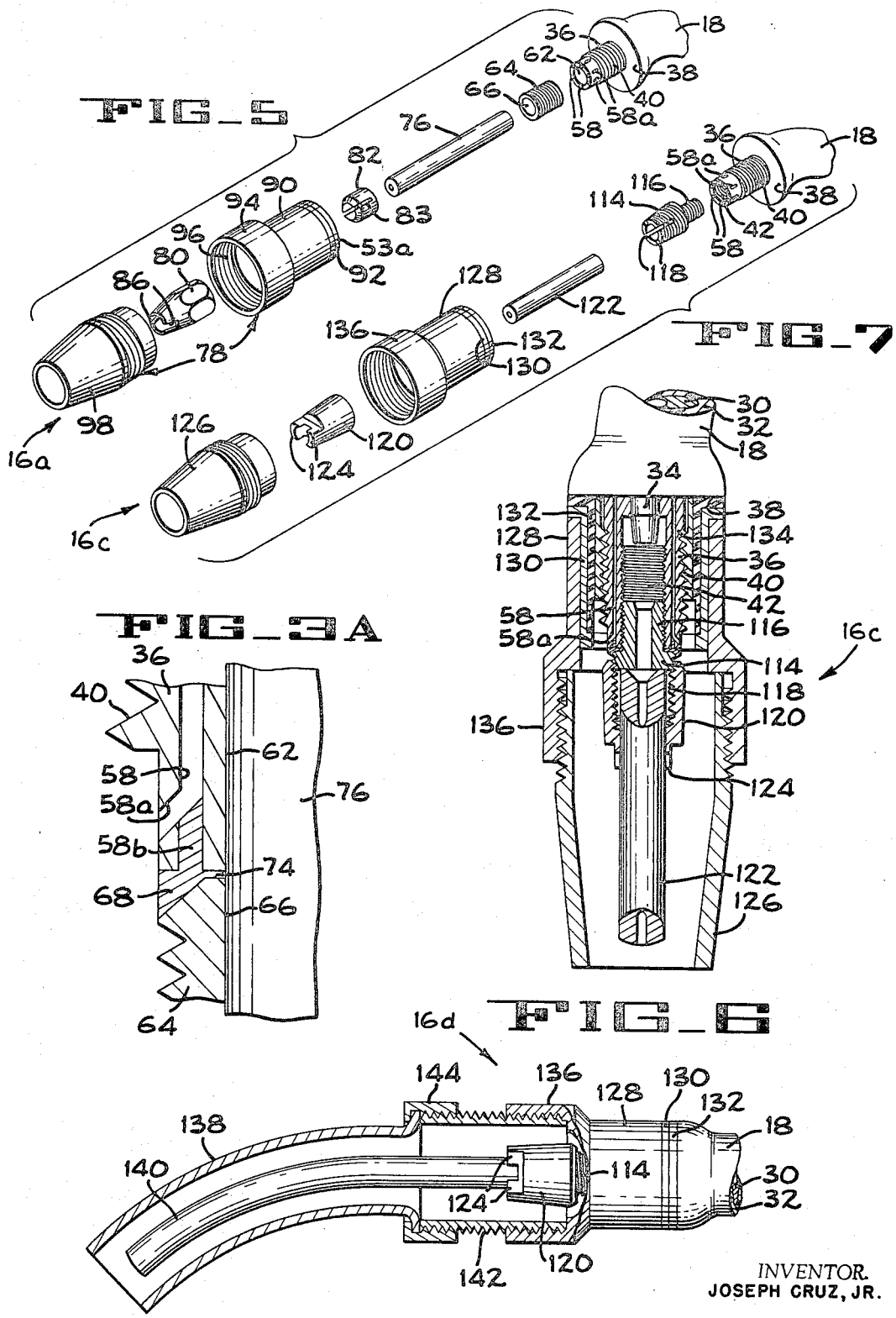

United States Patent Office 3,529,128
Patented Sept. 15, 1970

3,529,128
WELDING TORCH
Joseph Cruz, Jr., San Jose, Calif., assignor to FMC Corporation, San Jose, Calif., a corporation of Delaware
Filed Sept. 27, 1967, Ser. No. 671,041
Int. Cl. B23k 9/00
U.S. Cl. 219—130    7 Claims

ABSTRACT OF THE DISCLOSURE

A modified electrode guide tip and gas nozzle construction is provided for one conventional type of metal-inert gas welding torch. The tip cost is materially reduced because the tip is formed of a plain length of stock copper tubing modified only by a simple bevel. The nozzle assembly comprises a barrel that carries the electrical insulating parts of the assembly, and a nozzle section which is less expensive than the conventional one-piece barrel and nozzle since the insulating parts are eliminated from the rapidly wearing end portion of the nozzle assembly.

BACKGROUND OF THE INVENTION

The general field of invention to which the present invention pertains is electric arc welding. More specifically, the invention concerns a welding torch construction for use in a metal inert-gas (MIG) welding procedure in which a continuous electrode wire is fed through a tip coaxially enclosed by a nozzle which blankets the weld area and surrounds the exposed part of the electrode with a shielding envelope in inert gas.

A known type of MIG welding torch has, projecting from the handle, a hollow terminal stud which is both exteriorly and interiorly threaded. The exterior threads support a tubular nozzle which is supplied (internally through axial ports in the wall of the stud) with a continuous flow of inert gas. The interior threads of the stud support the threaded shank of a tubular electrode guide or tip coaxially within the nozzle, and a continuous electrode is automatically pushed through the tip into the weld area blanketed by the gas.

According to the particular welding technique being employed, the end of the tip desirably has a certain axial relation to the end of the nozzle. Thus, the tip and nozzle are more or less matched items used for one type of welding operation and are individually non-interchangeable with a tip and nozzle used for a different type of welding operation because the threaded tip does not permit its axial adjustment within the nozzle.

Due to oxidizing heat and molten weld splatter from the weld area, the life of the tips is relatively short. For example, one welder may use about fipe tips in one working day on a heavy equipment, high output production line. At approximately three dollars per conventional tip, the cost of tip replacement is a substantial item; the projected annual estimate for a production line of forty welders using tips at the indicated rate is approximately $144,000.00 for only the tips. One of the objects of the invention is to materially reduce the cost of the tips. By using the tips and nozzles of the present invention, one production line of forty welders has realized an annual savings, on tips alone, of about $124,000.00.

BRIEF SUMMARY OF THE INVENTION

The present invention concerns a tip and nozzle construction, for an existing type of MIG welding torch, which provides a tip cut from commercially available tubular copper stock so that the tip is relatively inexpensive as compared to the conventional tip having a threaded shank. The one-piece conventional nozzle which incorporates electrical insulation is replaced by a two piece assembly wherein only the rapid-wearing tip of the nozzle need be replaced to renew the assembly. Axial adjustment of the tip can be made so that the torch is adapted for either of two different welding techniques.

BRIEF DESCRIPTION OF THE DRAWINGS

FIG. 1 is a side elevation of a commercially available welding torch used in a MIG welding process.
FIG. 2 is an enlarged section through the nozzle end portion of the welding torch shown in FIG. 1.
FIG. 3 is an enlarged section, similar to FIG. 2, showing the modifications and alterations to the conventional torch and forming the subject matter of the present invention.
FIG. 3A is an enlarged fragmentary section of the area indicated by the arrow 3A on FIG. 3.
FIG. 4 is a reduced section of a torch similar to that shown in FIG. 3, but having a curved end portion for welding in sites inaccessible to torches having straight end portions.
FIG. 5 is an exploded perspective of the parts comprising the torch shown in FIG. 3.
FIG. 6 is a section similar to FIG. 3, showing a modified form of the present invention.
FIG. 7 is an exploded perspective of the parts comprising the torch shown in FIG. 6.
FIG. 8 is a section of part of the FIG. 6 torch, but with a curved tip and nozzle.

DESCRIPTION OF THE PREFERRED EMBODIMENTS

A well known metal-inert gas or MIG welding torch 10 (FIG. 1) includes a tubular handle portion 12 which encloses flexible conduits 14 that transmit an inert gas and a continuous, electrically energized bare wire electrode 15 through the handle and into a welding head 16. In the MIG welding process, the welder depresses an electrical switch actuator 17 which causes the electrode 15 to be fed through a curved insulated neck or body portion 18 and through an electrode guide or tip 19 (FIG. 2) that is coaxially mounted in a nozzle 20. At the same time, the inert gas is projected from the nozzle at relatively low velocity to form a shielding envelope 21 which surrounds the electrode and prevents oxidation of the weld seam. The electrode is consumed in an electric arc 22 struck to the electrically grounded workpiece 24, and is advanced automatically through the nozzle as it is deposited on a weld seam 26.

In the Spray Arc technique of MIG welding, a high amperage welding current is used and the molten electrode metal is deposited in spray droplets at a relatively long distance from the workpiece. In Spray Arc welding, the end of the tip 19 is within the nozzle 20. In the Short Arc technique of MIG welding, a low amperage welding current is used and the electrode is held relatively close to the workpiece. In using the latter technique, the electrode periodically contacts the workpiece to cyclically extinguish the arc, and the molten metal is deposited in drops onto the weld seam. For this welding process the end of the tip 19 projects from the nozzle 20. Because the tip 19 cannot be axially adjusted within the nozzle 20, each of the stated welding techniques (with a given nozzle) requires a particular length of tip which cannot be used for the other. Both welding techniques develop intense heat, adjacent the end surface 28 of the nozzle 20, which causes oxidation of the tip 19 and also erodes the nozzle.

The insulated neck 18 of the conventional welding torch, FIG. 2, includes a metallic inner conduit 30 which is sheathed by an electrically and thermally resistant, molded phenolic plastic 32. In a manner not critical to the present disclosure, the conduit 30 is in electrically conductive relation with the welding control means, not shown, and is provided with a guide tube 34 for the electrode 15. A hollow stud 36 projects beyond the end surface 38 of the neck 18, as best shown in FIG. 5.

Continuing with the description of the conventional welding head 16 (FIG. 2), the hollow stud 36 is provided with external threads 40 for mounting the nozzle 20, and with a central bore having internal threads 42 for securing an exteriorly threaded neck 44 of the electrode guide tip 19. The tip 19 is formed of solid copper with a small axial bore 46 which guides the electrode wire through the nozzle 20. A sealing washer 50 is mounted on the neck 48 intermediate a maximum-diameter portion 52 of the body of the tip 19, and the end surface of the stud 36 to provide a gas tight seal for a purpose later mentioned. As previously mentioned, individual tips are required for the two welding procedures and may be expended at a rate of about five per day. Thus, each welding torch (especially when periodically used for both types of welding) requires a substantial tip inventory in order to remain in operation. Further, each tip 19 at the time of conception of the present invention cost about three dollars. Accordingly, each torch 10 in a full time welding operation has a direct replacement cost, for only the tips, that can be as high as fifteen dollars per eight hour shift.

The nozzle 20 comprises an elongate tube which at one end has an electrical insulating sleeve 53 pressed therein with a radial flange 54 of the sleeve overlying that end of the nozzle. Mounted with a press fit in the sleeve 53 is an interiorly threaded metallic bushing 56 which is engaged with the threaded stud 36. The nozzle can be installed, by rotating it hand-tight against the end surface 38 of the neck 18, only after the tip 19 has been installed. This assembly sequence is due to the fact that the tip, being cylindrical, must be tightened by using pliers and therefore has to precede installation of the nozzle. A disadvantage of the tip 19 is that it sometimes breaks, when tightened, and leaves the threaded neck 44 in the stud 36.

Returning to the construction of the stud 36 (FIGS. 2 and 5) in the conventional welding torch, a plurality of axially extending, circumferentialy spaced gas passages 58 extend through the wall of the stud. Due to manufacturing considerations, the gas passages 58 extend through the end wall of the stud 36. When the sealing washer 50 is tightly gripped between the stud 36 and the adjacent end surface of the tip 19, gas is prevented from flowing longitudinally from the stud 36. Extending radially outward from each passage 58 is a diagonal passage 58a that directs the gas through the nozzle and along the tip 19 at a point below the end of the metallic bushing 56. An inert gas is supplied to the passages 58 when the operator depresses the switch actuator 17, whereupon the interior of the nozzle 20 is filled with gas which flows onto the weld area as depicted in FIG. 1.

In the modified welding head 16a (FIG. 3) of the present invention, the threaded stud 36 that projects from the neck 18 is altered by machining out the internal threads 42 (FIG. 2) to provide a smooth internal bore 62. None of the other parts shown in FIG. 2 are used, but functionally similar parts are provided. Affixed to the altered stud 36 is a tubular extension piece 64 having a central bore 66 of the same diameter as the bore 62 in the stud 36.

The extension piece 64 (FIG. 3A) is secured with a silver solder weld 68 to the stud 36. During the welding operation the stud 36 and the extension piece 64 are aligned by a carbon rod, not shown, which is pushed into the bores 66 and 62 and removed after welding. At the same time, non-weldable wires, not shown, are inserted through the diagonal passes 58a. A small gap at 74 is left between the extension piece 64 and the stud 36 so that solder flows into this area to maximize the weld area. After the wires are removed from the passages 58a and the carbon rod is removed, the extension piece 64 is permanently secured to the stud 36, and the terminal linear portions 58b of the gas passages 58 are permanently sealed. Thus, the effective length of the stud 36 is increased, and each gas passage 58 has only one outlet that requires no sealing washer 50 as is required in the FIG. 2 structure.

An electrode guide or tip 76 (FIG. 3), comparable to the tip 19 (FIG. 2), is slidably received in the bores 66 and 62, and when axially adjusted to a desired operating position relative to a nozzle assembly 78, is secured in place by tightening a locking device which comprises a conventional compression nut 80 and a compression bushing 82, having longitudinal slots 83 (FIG. 5), which define resiliently flexible wall sections.

A particular feature of the invention is that the tip 76 (FIG. 3) is inexpensively made from copper bar stock which is available with various bores to suit the selected wire electrode, such as .030 of an inch wire. After cutting the bar, its inner end is beveled to form a conical surface 84 which guides the electrode wire from the guide tube 34 into the tip 76 when the torch is initially placed in service. The other end of the tip may be ground smooth to inhibit the adherence of weld splatter. Thus formed, the tip 76 performs the same function as the original tip 19 (FIG. 2) but costs only one-sixth the price of the original tip. Further, the tip cannot break off within the stud 36 in the manner mentioned in connection with the conventional tip 19.

As best shown in FIG. 5, the small end of the compression nut 80 is provided with diametrically opposed notches 86 which are provided to receive the endwise projecting lugs of a tubular wrench, not shown. Thus, even though the tip is enclosed by the nozzle assembly 78, it can be axially adjusted inward, if the tip has previously been used for Short Arc welding and is being changed for Spray Arc welding, by loosening the compression nut and without any disassembly of the welding head 16a. The reverse operation is also possible; the tip can be pulled outward relative to the nozzle with the aid of needle-nose pliers when the compression nut is loose. It should be mentioned, however, that the bevel surface 84 of the tip 76 should be close to the guide tube 34 for very small electrode wires (smaller than 3/64 of an inch) so as to inhibit kinking of the wire between the guide tube and tip.

The nozzle assembly 78 comprises a nozzle barrel 90 that incorporates a hard fiber insulatingg bushing 53a and a threaded metallic inner bushing 56a. The barrel and bushings are comparable to the corresponding parts at the attachment end of the nozzle 20 (FIG. 2). In addition, a flanged copper sleeve 92 circumscribes the insulating bushing 53a. The copper sleeve is press-fitted into the barrel 90 and readily deforms to grip shallow axial interior grooves, not shown, that are formed in the wall of the barrel. The other end of the barrel 90 is provided with an enlarged diameter skirt 94 having interior threads 96 for mounting a stub nozzle 98. Because the nozzle 98 does not include the insulating bushing 53a and associated parts, it can be replaced at much less cost than the conventional nozzle 20 (FIG. 2) when it is worn or damaged beyond further use. The actual cost savings at the time the present invention was conceived was approximately five dollars per welding torch by using the nozzle 98 instead of the nozzle 20. While the cost of the nozzle assembly 78 is about the same as the nozzle 20, replacement of only the nozzle 98 renews the nozzle assembly 78, whereas the conventional one-piece nozzle in FIG. 2 must be totally replaced.

The welding head structure 16b, FIG. 4, is in all details except for a nozzle 102, a tip 104 and a barrel 106 the same as the welding head structure 16a described in conjunction with FIG. 3. The tip 104 is formed of tubular copper stock in the same way described for the tip 76, and is then bent to arcuate shape. The particular utility of the welding head 16b is that the nozzle and tip, being curved, provide convenient access to weld seams which would otherwise be out of reach. Thus, the neck 18 of the usual welding head 16 (FIG. 1) depends at 60 degrees from the axis of the torch handle 12, and the curved tip and nozzle of FIG. 4 are offset another 60 degrees from the neck 18 so that the electrode wire can be delivered onto a weld seam 120 degrees from the axis of the torch handle 12.

Since the compression nut 80 (FIG. 4) cannot be tightened when the nozzle 102 is in place, the nozzle is provided with a flanged inner end 108 that is held against the end of the barrel 106 by an internally threaded, freely rotatable coupling annulus 110. The annulus 110 is engaged hand-tight on external threads of the barrel 106 and is installed after the tip 104 has been locked in place by means of a wrench applied to the hexagonal portion of the compression nut 80. Since no axial adjustment of the tip can be made without disturbing the coaxial arrangement of the tip and nozzle, different length tips are necessary to change their terminal end space relation.

The modified welding head 16c (FIG. 6) uses the stud 36 (FIG. 7) without modification. A tubular extension piece 114 is provided with a threaded shank 116 of the same size of the neck 44 (FIG. 2) of the conventional tip 19. The body 114 is threaded into the stud 36 and then silver soldered to the stud in a manner similar to that which has already been described, so that the extension body becomes a permanent part of the stud. As in the case of the FIG. 3 welding head 16a, the ends of the gas passages 58 are blocked off by the silver solder so that the the gas issues from the diagonal passages 58a.

The extension piece 114 (FIG. 7) is longitudinally tapered and externally threaded with pipe threads. The wall of the extension body is provided with slots 118 and is relatively thin so that an internally tapered compression fitting or nut 120 threaded tightly onto the extension body will cause the walls to spring inward into gripping engagement with a tip 122 (FIG. 6). As best shown in FIG. 7, the nut 120 is milled with diametrically opposed flat portions that form endwise projecting lugs 124 for engagement with recesses in the end wall of a tubular wrench, not shown. The tubular form of the wrench permits it to slide into a nozzle 126 and over the installed tip 122 into meshing engagement with the lugs 124. The tip 122 can thus be installed, adjusted or removed without removing the nozzle.

A nozzle barrel 128 is provided which includes a press-fit copper sleeve 130, an insulating bushing 132 and an internally threaded metallic bushing 134 that are comparable to the corresponding parts illustrated in FIG. 3. Similarly, the barrel 128 has an enlarged, internally threaded skirt 136 which receives the threaded end of the nozzle 126. As in the case of the welding head 16a, the welding head 16c has similar cost advantages over the conventional welding head 16 (FIGS. 1 and 2).

The welding head structure 16d illustrated in FIG. 8 is comparable in function to that which was described in connection with FIG. 4, that is, it adapts the welding torch to deposit weld material in limited-access locations by means of curved tip and nozzle members 138 and 140. The tip is formed of tubular copper stock in the same manner described for the tip 104, and then bent. In order to use the same exterior body of the extension barrel assembly that is employed in the welding head 16c, a threaded nipple 142 is mounted between the nozzle 140 and the barrel 128. When the nipple 142 is threaded fully into the barrel after the tip has been locked by applying a wrench to the flat portions of the compression nut 120, the nozzle is rotatively adjusted and then secured to the nipple by a freely rotatable coupling annulus 144.

In summary, the present invention provides a modified tip and nozzle construction, for an existing MIG welding torch, which substantially reduces the replacement cost of the tip and nozzle of the existing torch. Further, the invention makes possible two different welding techniques with only one axially adjustable tip, whereas the conventional torch using axially non-adjustable threaded tips requires separate tips for each of the two welding techniques, or a different length of nozzle. Modified embodiments of the invention provide the same advantages in a curved tip and nozzle arrangement which permit welding access to otherwise inaccessible or limited-access locations.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. In a MIG welding torch having a projecting stud which is exteriorly threaded for supporting a tubular gas shield and interiorly threaded for receiving the threaded end of an electrode guide, the combination therewith of a tubular extension secured to said stud in axial alignment therewith, the free end of said extension having exterior threads and longitudinally extending open-end slots defining resilient arcuate wall sections extending from said free end into said threads, a tubular unthreaded electrode guide having one end portion located in said extension, and a compression nut circumscribing said electrode guide and having internal threads engaged with said exterior threads, said interior and exterior threads being interengaged such that said resilient wall sections of the extension are radially inwardly flexed into gripping engagement with said electrode guide.

2. Apparatus according to claim 1 and a tubular adapter barrel, a hollow cylindrical insulating bushing mounted within one end portion of said adapter barrel, a malleable metallic sleeve mounted on said insulating bushing and press-fitted into said barrel, and an internally threaded metallic bushing mounted in said insulating bushing.

3. Apparatus according to claim 2 wherein said barrel is provided with an internally threaded free end portion, and a tubular nozzle having a threaded end portion engaged with and supported by the threaded end portion of said barrel.

4. Apparatus according to claim 3 wherein said electrode guide is axially adjustable relative to said extension for selectively adapting the torch to both short arc and spray arc welding techniques.

5. In a MIG welding torch having an insulated body and a projecting stud which is exteriorly threaded for supporting a tubular gas shield and interiorly threaded for receiving the threaded end of an electrode guide, the combination therewith of a longitudinally slotted tubular compression member axially aligned with and forming an extension of said stud, a compression fitting engaged with said slotted compression member, and a tubular electrode guide concentrically and releasably secured within said slotted compression member by said compression fitting.

6. Apparatus according to claim 5 and a two piece tubular gas shield including a mounting barrel and a nozzle, means mounting one end portion of said barrel in electrically isolated engagement with said stud, and means releasably securing the other end portion of said barrel to said nozzle.

7. Apparatus according to claim 5 wherein said stud is provided with exterior threads, said compression fitting extending over said electrode guide and being internally threaded to engage the external threads of said stud, said compression fitting being arranged to squeeze said compression member into gripping engagement with said electrode guide.

References Cited
UNITED STATES PATENTS

| | | | |
|---|---|---|---|
| 2,881,305 | 4/1959 | Wojciak et al. | 219—130 |
| 2,952,766 | 9/1960 | Craig et al. | 219—130 |
| 3,112,392 | 11/1963 | Orr et al. | 219—130 |
| 3,121,784 | 2/1964 | McGinty et al. | 219—130 X |
| 3,132,240 | 5/1964 | McCartney | 219—75 X |
| 3,143,633 | 8/1964 | Wadleigh | 219—130 |
| 3,219,793 | 11/1965 | Mahoney | 219—75 X |

ANTHONY BARTIS, Primary Examiner

C. L. ALBRITTON, Assistant Examiner

U.S. Cl. X.R.

219—75